United States Patent
Dominke et al.

(10) Patent No.: US 6,659,253 B2
(45) Date of Patent: Dec. 9, 2003

(54) METHOD FOR OPERATING A CLUTCH AND CONTROL DEVICE FOR IMPLEMENTING THE METHOD

(75) Inventors: Peter Dominke, Bietigheim-Bissingen (DE); Karl-Heinz Senger, Farmington Hills, MI (US); Peter Baeuerle, Ludwigsburg (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/016,591

(22) Filed: Oct. 26, 2001

(65) Prior Publication Data
US 2002/0148700 A1 Oct. 17, 2002

(30) Foreign Application Priority Data
Oct. 26, 2000 (DE) .......................................... 100 53 110

(51) Int. Cl.$^7$ ............................................... B60K 41/22
(52) U.S. Cl. .................. 192/103 F; 192/3.31; 192/3.29; 192/109 F; 477/176; 477/180
(58) Field of Search .......................... 192/109 F, 103 F, 192/3.29, 3.31; 477/180, 176

(56) References Cited
U.S. PATENT DOCUMENTS

| | | | | |
|---|---|---|---|---|
| 4,640,395 A | * | 2/1987 | Murasugi et al. | 192/3.31 |
| 4,729,461 A | * | 3/1988 | Nishikawa et al. | 192/3.31 |
| 5,060,769 A | * | 10/1991 | Yoshimura et al. | 192/3.29 |
| 5,672,132 A | * | 9/1997 | Schwab | 192/103 F |
| 5,950,789 A | * | 9/1999 | Hosseini et al. | 192/109 F |
| 6,033,342 A | * | 3/2000 | Steinel et al. | 477/181 |
| 6,115,661 A | * | 9/2000 | Hosseini et al. | 192/109 F |
| 6,132,336 A | * | 10/2000 | Adachi et al. | 477/169 |
| 6,412,617 B1 | * | 7/2002 | Spijker et al. | 192/103 F |

* cited by examiner

*Primary Examiner*—Rodney H. Bonck
*Assistant Examiner*—Eric M. Williams
(74) *Attorney, Agent, or Firm*—Kenyon & Kenyon

(57) ABSTRACT

A method for operating a clutch (10), whose clutch slip (s) is adjusted to a setpoint value (s0) with the aid of a manipulated variable, should allow a clutch to be controlled in a particularly reliable and stable manner. To this end, the present invention provides for a slip value only being permitted to be a setpoint value (s0), when the derivative of the friction coefficient/slip characteristic at this slip value exceeds a specifiable limiting value. In particular, the setpoint value (s0) is selected as a function of a number of operating parameters, inside a range of permissible setpoint values (s0); the slip value, at which the derivative of the friction coefficient/slip characteristic falls below a specifiable limiting value, being selected as an upper limit (G) of the range of permissible setpoint values (s0).

20 Claims, 2 Drawing Sheets

METHOD FOR OPERATING A CLUTCH AND CONTROL DEVICE FOR IMPLEMENTING THE METHOD

FIELD OF THE INVENTION

The present invention relates to a method for operating a clutch, whose clutch slip is adjusted to a setpoint value, using a manipulated variable. The present invention also relates to a control device for a slip-controlled clutch, in order to implement the method.

BACKGROUND INFORMATION

A slip-controlled clutch can be used in the power train of a motor vehicle. Such a clutch usually transmits a torque applied to an input shaft, to an output shaft, via a number of frictionally interconnected coupling elements. In this context, the slip occurring between the coupling elements can result in the output shaft having a speed lower than that of the input shaft, an exact definition of the slip being the difference of the speeds of the input and output shafts.

SUMMARY OF THE INVENTION

The response characteristic and the general characteristic curve of such a clutch can be dependent on the current slip condition. This can be used in a clutch control system, in order to set a desired clutch performance. To this end, the clutch slip in a slip-controlled clutch is adjusted to a preselected, e.g. operating-point-dependent setpoint, by defining a manipulated parameter.

The object of the present invention is to specify a method for operating a clutch of the type mentioned above, which allows particularly reliable and stable control. In addition, the intention is to specify a control device that is particularly suitable for implementing the method.

The object of the present invention is achieved with regard to the method, in that a slip value is only selected as a reliable setpoint value, when the derivative of the friction coefficient/slip characteristic at this slip value exceeds a specifiable limiting value.

Advantageous refinements of the present invention are the subject matter of the dependent claims.

The present invention starts out from the consideration that, for particularly reliable and stable operation, the slip-controlled clutch should be operated, using a setpoint slip value, at which the clutch has self-stabilizing characteristics. In this context, self-stabilization of the clutch can be achieved using an operating point, at which the coefficient of friction of the coupling elements increases with increasing clutch slip. Using the increase in the friction coefficient, the clutch namely allows a comparatively large torque to be transmitted as a result of increasing slip. But if the transmitted torque remains constant with increasing slip, then the slip decreases automatically as a result of the increase in the coefficient of friction. In order to attain the self-stabilizing characteristics of the clutch, the operating point or setpoint value for the slip should therefore be selected in a range, in which the coefficient of friction continuously increases as a function of the slip.

In particular, the characteristic curve of the friction coefficient as a function of the slip can have a maximum as a result of the material properties of the coupling elements. In this case, it is intended that the setpoint value for the slip always be selected in an advantageous manner, to be less than the maximum point on the friction coefficient/slip characteristic. In other words, the setpoint value is advantageously selected as a function of a number of operating parameters, inside a range of permissible setpoint values; the slip value, at which the derivative of the friction coefficient/slip characteristic falls below a specifiable limiting value, being selected as an upper limit of the range of permissible setpoint values.

In order to detect a possible maximum in the friction coefficient/slip characteristic, it is provided that the relationship be monitored between a manipulated variable, by means of which the coefficient of friction is directly controlled and the slip is therefore indirectly controlled, and the slip. In this context, it is deduced that the coefficient of friction is continuously increasing as a function of the slip, and that the clutch therefore has the desired, self-stabilizing characteristic, when the magnitude of the derivative of the manipulated variable/slip characteristic does not yet fall below an additional, specifiable limiting value. In other words, the manipulated variable/slip characteristic is determined in order to evaluate the friction coefficient/slip characteristic. All of the slip values, for which the magnitude of the derivative of the manipulated variable/slip characteristic is greater than the additional limiting value, are considered to be permissible setpoint slip values in the sense of self-stabilizing performance.

The clutch is advantageously used in the power train of a motor vehicle. In an advantageous further refinement, the clutch is used on the output end of a continuously variable transmission. For such a continuously variable transmission is comparatively sensitive to torque surges, which may be introduced into the transmission, via the output shaft, due to changing road characteristics or driving situations. Therefore, the continuously variable transmission is advantageously protected against such torque surges, by inserting the clutch into the output shaft. In this context, the operation of the clutch in the self-stabilizing range is particularly advantageous for especially stable and reliable vehicle performance.

The method can be used in a control method for the clutch, in a particularly favorable and simple manner, by utilizing a parameter as a manipulated variable, which is simple to measure and physically available. To this end, a clutch pressure or a clamping force is advantageously used as a manipulated variable. In this context, the clutch pressure is particularly suitable for a method to operate a wet multi-plate clutch or a torque-converter lockup clutch, where the slip is set by the clutch pressure in each instance, the coefficient of friction being a function of the clutch pressure. In this case, the clutch pressure is therefore an available parameter already, and can be used in a particularly simple manner as an input variable for controlling the clutch. On the other hand, the clamping force is particularly suitable for a method to operate a dry clutch. In the case of such a clutch, the coupling elements are brought into frictional contact by an externally applied clamping force, the coefficient of friction between the coupling elements being a function of the clamping force. In this case, the clamping force is therefore an available parameter already.

For a wet multi-plate clutch, transmittable torque M is given as a function of coefficient of friction $\mu$ and clutch pressure P as follows:

$$M = \mu \cdot r \cdot z \cdot (A \cdot P - F),$$

where r is the effective friction radius, z is the number of friction surfaces, A is the piston area of the friction-clutch actuating device, and F is a minimum force for power transmission. In the case of a constant transmitted torque M, this function yields the following relationship between clutch pressure P and coefficient of friction u:

$$P=1/A \cdot (M/(\mu \cdot r \cdot z)+F).$$

Therefore, clutch pressure P decreases with increasing coefficient of friction u; thus, a maximum in the functional relationship between coefficient of friction $\mu$ and the slip corresponds to a minimum in the relationship between clutch pressure and slip. Therefore, a setpoint slip value less than the minimum point on the clutch pressure/slip characteristic is selected when using the clutch pressure as a manipulated variable. Even when the derivative of the clutch pressure/slip characteristic has a negative value in this range, one can infer that a setpoint slip value is permissible in this sense, when the derivative of the clutch pressure/slip characteristic does not yet exceed the specifiable limiting value.

For a dry clutch in which the clamping force is used as a manipulated variable, the same relationship regarding the functional dependence of slip is obtained from a qualitative standpoint: the clamping force also decreases with increasing coefficient of friction $\mu$.

In order to continue ensuring reliable and especially verifiable operational performance, even after a comparatively long clutch running period, the setpoint value of the slip-controlled clutch is advantageously checked and, if necessary, updated during operation, in the form of adaptive correction, after expiration of predefined maintenance intervals, or also periodically. In this manner, e.g. aging effects or changes in the operational performance resulting from material fatigue can be compensated for.

To update the setpoint value, the setpoint value is purposefully varied in a phase in which the coupling torque to be transmitted is constant over time, and the resulting slip, i.e. the difference in the speeds of the input and output shafts, is measured. Using the manipulated variable/slip characteristic measured in this manner, it is then checked if the magnitude of its derivative exceeds the preselected limiting value, within the slip-parameter range regarded as the permissible setpoint-value range until now. If this is the case, then the upper limit of the range of permissible setpoint values is advantageously updated, using the preceding measurement.

Depending on the operating conditions, it can be desirable to operate the slip-controlled clutch with as high a slip as possible, e.g. in order to ensure an especially large, available control range. In order to also ensure self-stabilizing clutch performance in this case, the setpoint value is advantageously selected to be approximately equal to the upper limit of the range of permissible setpoint values.

With regard to the control device, the named objective is achieved, using a selector unit, which selects the setpoint value as a function of a number of operating parameters, inside a range of permissible setpoint values; and using a diagnostic unit, which only allows a setpoint value to be a permissible setpoint value, when the derivative of the friction coefficient/slip characteristic at this point exceeds a specifiable limiting value.

For a particularly simple and, therefore, reliable selection procedure, the control unit is designed in an advantageous refinements, in such a manner, that the selection unit selects the setpoint value inside a range of permissible setpoint values. As an upper limit of the range of permissible setpoint values, the diagnostic unit advantageously selects the slip value at which the derivative of the friction coefficient/slip characteristic falls below a specifiable limiting value.

The control device advantageously selects a clutch pressure or a clamping force as a manipulated variable. When the control device is designed for the selection of the clutch pressure as a manipulated variable, the control device is therefore particularly suited for use with a wet multi-plate clutch or a torque-converter lockup clutch. However, the control device is particularly suited for use with a dry clutch, when it is designed for the selection of clamping force as a manipulated variable.

In order to allow the permissible setpoint value range to be updated, and thus, allow possible aging effects to be compensated for, an advantageous further refinement provides for the diagnostic unit being connected on the input side to a measuring device for ascertaining the clutch slip.

In particular, the advantages attained by the present invention consist in a self-stabilizing performance of the clutch, and thus, an especially stable operational performance, being ensured by limiting the range of permissible setpoint slip values to a range, in which the friction coefficient/slip characteristic continuously increases. By selecting an upper limiting value for the slip in a range in which the friction coefficient/slip characteristic still has at least a minimum slope, the operating point of the clutch is also selected so that the self-stabilizing performance of the clutch is even maintained in the case of slight system deviations. Therefore, undesirable frictional vibrations, which can especially occur at an operating point at which the coefficient of friction decreases with increasing slip, can also be substantially ruled out for the operation of the clutch.

BRIEF DESCRIPTION OF THE DRAWINGS

An exemplary embodiment of the present invention is explained in detail with reference to a drawing, in which is shown.

DETAILED DESCRIPTION

Figure 1:
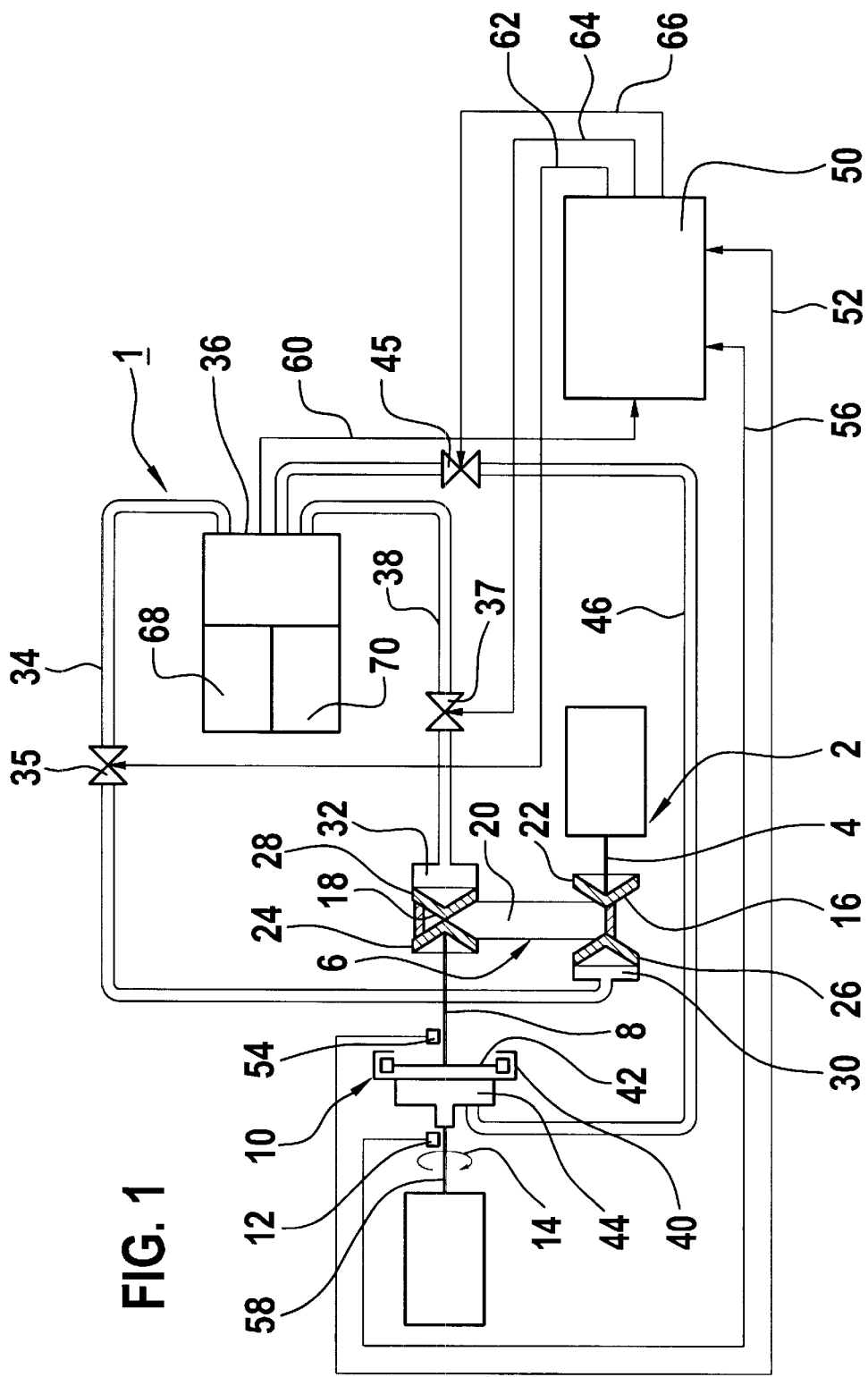
FIG. 1 a schematic of a motor-vehicle power train.

Power train 1 according to FIG. 1 has a vehicle engine 2, which is connected to a continuously variable transmission 6, via an input shaft 4. Continuously variable transmission 6 is connected on the output side, via a shaft 8, to a clutch 10, which, for its part, is connected on the output end or the drive end, via a drive shaft 12, to a drive unit 14 of a motor-vehicle, e.g. to a set of driven wheels.

Continuously variable transmission 6 includes a first V-pulley 16 situated on input shaft 4 and a second V-pulley 18 situated on shaft 8, which are interconnected by a tension element 20. In the exemplary embodiment, tension element 20 is made of flexible metallic material, but it can alternatively be manufactured from plastic or elastomer, as well. Each V-pulley 16, 18 includes a first, V-pulley half 22 and 24, respectively, which is stationary with respect to the associated input shaft 4 and shaft 8, respectively; and a second V-pulley half 26 and 28, respectively, which can move in the axial direction with respect to the associated input shaft 4 and shaft 8, respectively.

First V-pulley 16 is assigned a first fluid chamber 30, and the second V-pulley is assigned a second fluid chamber 32. The pressure of a working fluid set in first fluid chamber 30 is used, for example, to position V-pulley half 26 in the axial direction of input shaft 4, and the pressure of the working fluid set in second fluid chamber 32 is used, for example, to position V-pulley half 28 in the axial direction of shaft 8. The controlled adjustment of the compression ratios in fluid chambers 30, 32 allows the effective radii, at which tension element 20 wraps around V-pulleys 16, 18, to be adjusted. Therefore, the transmission ratio of the transmission formed by V-pulleys 16, 18 can also be infinitely adjusted by appropriately selecting the compression ratios in fluid chambers 30, 32. In addition, the total force with which tension element 20 wraps around V-pulleys 16, 18 can also be adjusted, using the compression ratios in fluid chambers 30, 32. Therefore, tension element 20 can also be prevented from slipping by appropriately selecting the compression ratios in fluid chambers 30, 32.

In order to set a suitable working-fluid pressure in fluid chamber 30, as a function of the operating state, the fluid chamber is connected to a hydraulic tank 36 via a hydraulic line 34, into which a throttle valve 35 is inserted. In the same manner, fluid chamber 32 is connected to hydraulic tank 36, via a hydraulic line 38 provided with a throttle valve 37.

Clutch 10 includes, as coupling elements, a clutch housing 40 situated at drive shaft 12, as well as a clutch disk 42 situated at shaft 8, which are frictionally interconnected. Because of the frictional connection, the named coupling elements can have a clutch slip s with respect to each other, which is defined by the difference of the speed of shaft 8 connected to clutch disk 42 on one side, and the speed of drive shaft 12 connected to clutch housing 40 on the other side. Coefficient of friction p between clutch housing 40 and clutch disk 42 is characteristic of the coupling torque M transmittable by the clutch; for its part, the coefficient of friction being adjustable, using a clutch pressure P of the working fluid prevailing in a pressure chamber 44 assigned to clutch 10. In order to set a desired clutch pressure P, pressure chamber 44 is connected to pressure supply 36, via a hydraulic line 46, into which a throttle valve 45 is inserted.

Clutch 10 is assigned a control device 50, which is connected on the input side, via a signal line 52, to a first speed sensor 54 situated at shaft 8; and is connected, via a signal line 56, to a second speed sensor 58 situated at drive shaft 12. Thus, speed sensors 54, 58 form a measuring device, by means of which the measured values of clutch slip s can be determined by subtraction. Furthermore, control device 50 is connected on the input side to hydraulic tank 36, via a signal line 60. On the output side, control device 50 is connected, via signal lines 62, 64, 66, to throttle valves 35, 37, 45 inserted into hydraulic lines 34, 38, and 46.

Clutch 10 is designed as a slip-controlled clutch. To this end, control device 50 includes a subtracter element not shown in further detail, which calculates an actual value for clutch slip s from the difference of the measured speed values of shaft 8 and drive shaft 12 transmitted by speed sensors 54, 58. The actual value of clutch slip s is then compared to a setpoint value s0 for the clutch slip. In response to deviations of the actual value from the setpoint value, which exceed a specifiable tolerance range, control device 50 outputs an actuating signal for throttle valve 45. The working-fluid pressure in pressure chamber 44, which is used as a manipulated variable in control device 50, is set as a function of this actuating signal. In this context, coefficient of friction $\mu$ can be calculated as a function of this manipulated variable.

Clutch 10 can alternatively be a dry clutch, whose clutch slip s between coupling elements can be adjusted by a clamping force.

During operation of clutch 10, a selector unit 68 integrated into control device 50 selects setpoint value s0 for the clutch slip as a function of a number of operating parameters characterizing the driving situation, and as a function of input parameters, e.g. for the driver to input. In addition, a diagnostic unit 70, which is also integrated into control device 50, checks, upon selection of setpoint value s0, if a possible setpoint value s0 is a permissible setpoint value for the clutch slip. A setpoint value s0 is considered permissible, if clutch 10 exhibits self-stabilizing characteristics at this setpoint value s0. To this end, it is ensured that, at each permissible setpoint value s0 used as an operating point of clutch 10, coefficient of friction $\mu$ of the coupling elements increases with increasing clutch slip s. For clutch slip s decreases automatically in response to a constant, transmitted torque, as a result of an increase in the coefficient of friction.

Figure 2:
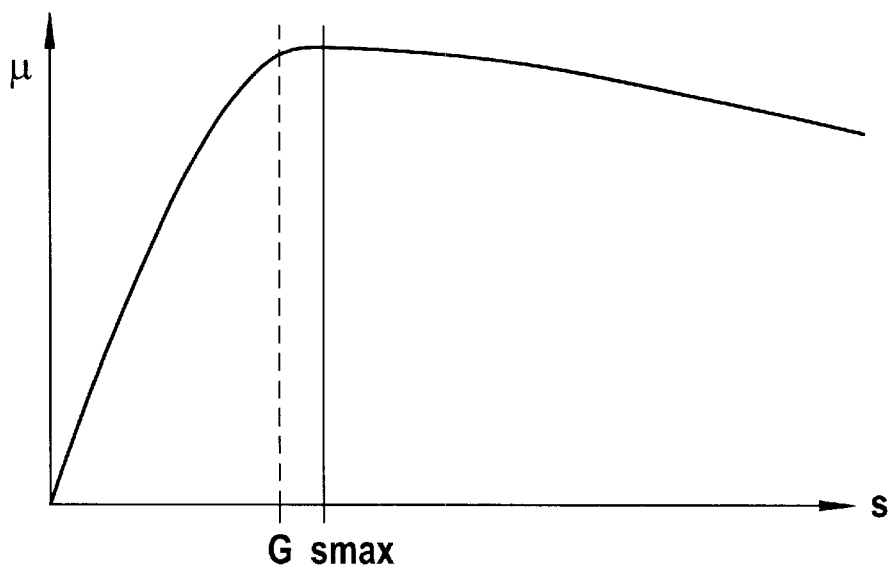
FIG. 2 a diagram for the dependence of a coefficient of friction on the clutch slip.

In each case, the operating point or setpoint value for clutch slip s is therefore selected in a range, in which the coefficient of friction continuously increases as a function of the clutch slip. FIG. 2 shows an example of the friction coefficient/slip characteristic of clutch 10. The dependence of friction coefficient $\mu$ on clutch slip s is plotted in this figure. Due to the material properties of the component parts used for clutch 10, the characteristic curve exhibits a maximum at a maximum point smax. For values of clutch slip s<smax, the characteristic has a positive slope and therefore, clutch 10 exhibits self-stabilizing behavior. But at values of clutch slip s>smax, the characteristic has a negative slope, and therefore, clutch 10 does not exhibit self-stabilizing behavior.

During the operation of clutch 10, the working-fluid pressure in pressure chamber 44 or clutch pressure P, which is used as a setpoint value, is directly available to control device 50. For the clutch 10 designed as a wet multi-plate clutch, transmittable torque M is given as a function of coefficient of friction $\mu$ and clutch pressure P as follows:

$$M=\mu \cdot r z \cdot (A \cdot P - F),$$

where r is the effective friction radius, z is the number of friction surfaces, A is the piston area of the friction-clutch actuating device, and F is a minimum force for power transmission. In the case of a constant transmitted torque M, this function yields the following relationship between clutch pressure P and coefficient of friction u:

$$P=1/A \cdot (M/(\mu \cdot r z)+F).$$

Therefore, clutch pressure P decreases with increasing coefficient of friction u; thus, the maximum at point smax in the functional relationship between coefficient of friction $\mu$ and the slip corresponds to a minimum in the relationship between clutch pressure P and clutch slip s at point smin. This relationship is represented for clutch 10 in FIG. 3, in the form of a manipulated variable/slip characteristic.

Figure 3:
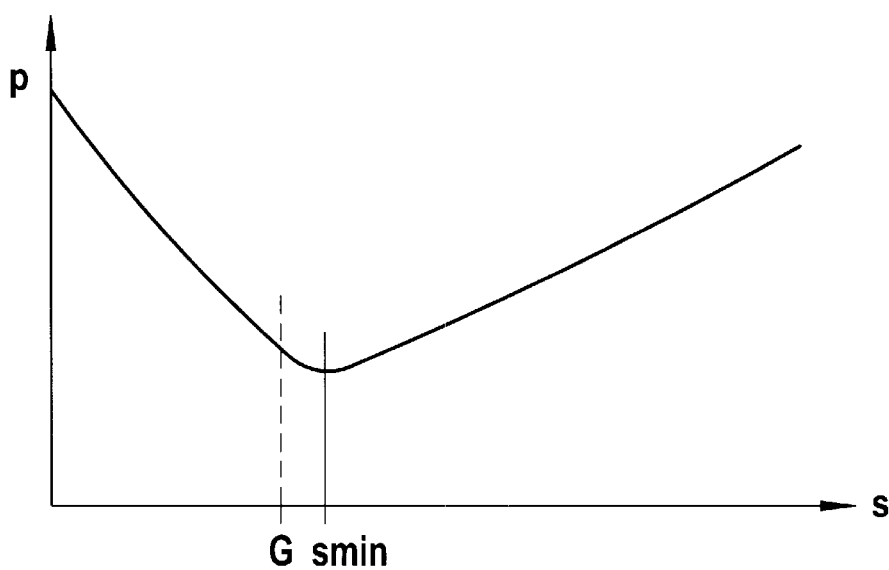
FIG. 3 a diagram for the dependence of a manipulated variable on the clutch slip.

In this context, clutch 10 has the desired self-stabilizing characteristics, when the curve of the manipulated variable, clutch pressure 10, as a function of clutch slip s, has a sufficiently large, negative slope. Therefore, diagnostic unit 70 only recognizes a setpoint value s0 for clutch slip s as being permissible, when the derivative of the manipulated variable/slip characteristic does not exceed a specifiable limiting value at this point. For clutch 10, whose manipulated variable/slip characteristic is represented in FIG. 3, this means that all setpoint values s0 for clutch slip s, which are situated to the left of limiting value G, are to be considered permissible. In other words, the range of permissible setpoint values s0 for clutch slip s is limited in the upward direction, by an upper limit G. In this context, upper limit G is selected in such a manner that, in the entire range of permissible setpoint values s0, it is ensured that the manipulated variable/slip characteristic has a negative slope, whose magnitude is greater than a specifiable limiting value.

Accordingly, upper limit G for the range of permissible setpoint values s0 for clutch slip s is selected to be below minimum point smin on the manipulated variable/clutch slip characteristic. In certain operating situations, setpoint value s0 for clutch slip s is indeed selected to be within the range of permissible setpoint values, but it is also selected to be as close to upper limit G as possible.

In order to ensure that the operating method of clutch 10 is suitable, regardless of possibly occurring aging effects or service-life effects, upper limit G of the range of permissible setpoint values s0 is occasionally updated. Such an update can be carried out in regular time intervals, e.g. in the form of regular maintenance intervals. However, the update can also be event-driven, e.g. triggered by registered, unforeseen system deviations in the slip control system. To update upper limit G of the range of permissible setpoint values s0, the manipulated variable/slip characteristic is measured during a phase, in which the coupling torque to be transmitted is constant over time. Using this measurement, the manipulated variable/slip characteristic is checked for the occurrence and position of a minimum. If a minimum is detected, the value of clutch slip s, at which the characteristic curve falls below the preselected limiting value, is ascertained. This value is then stored in diagnostic unit 70, as a new upper limit G for the range of permissible setpoint values.

What is claimed is:

1. A control device (50) for a slip-controlled clutch (10), whose clutch slip (s) can be adjusted to a setpoint value (s0) using a manipulated variable, having a selector unit (68), which selects the setpoint value (s0) as a function of a number of operating parameters, and having a diagnostic unit (70), which only allows a setpoint value (s0) to be a permissible setpoint value (s0), when the derivative of the friction coefficient/slip characteristic exceeds a specifiable limiting value.

2. The control device (50) as recited in claim 1, whose diagnostic unit (70) selects, as the upper limit (G) of a range of permissible setpoint values (s0), the slip value at which the derivative of the manipulated variable/slip characteristic falls below a specifiable limiting value.

3. The control device (50) as recited in claim 1, which selects a clutch pressure (P) as a manipulated variable.

4. The control device (50) as recited in claim 1, which selects a clamping force as a manipulated variable.

5. The control device (50) as recited in claim 1, whose diagnostic unit (70) is connected on the input side to a measuring device for ascertaining the clutch slip(s).

6. A method for operating a clutch, comprising:
adjusting a slip of a clutch to a setpoint value using a manipulated variable; and
allowing a slip value only to be the setpoint value when a derivative of a friction coefficient/slip characteristic at the slip value exceeds a specifiable limiting value.

7. The method according to claim 6, further comprising:
selecting the setpoint value as a function of a number of operating parameters, within a range of permissible setpoint values; and
selecting a slip value as an upper limit of the range of permissible setpoint values at which the derivative of the friction coefficient/slip characteristic falls below the specifiable limiting value.

8. The method according to claim 7, further comprising:
selecting the setpoint value to be approximately equal to the upper limit of the range of permissible setpoint values.

9. The method according to claim 7, further comprising:
determining a manipulated variable/slip characteristic in order to evaluate the friction coefficient/slip characteristic; and
updating the upper limit of the range of permissible setpoint values using a preceding measurement of the manipulated variable/slip characteristic.

10. The method according to claim 6, further comprising:
determining a manipulated variable/slip characteristic in order to evaluate the friction coefficient/slip characteristic.

11. The method according to claim 6, further comprising:
using the clutch in a power train of a motor vehicle.

12. The method according to claim 11, further comprising:
inserting the clutch on an output side of a continuously variable transmission.

13. The method according to claim 6, further comprising:
using a clutch pressure as the manipulated variable.

14. The method according to claim 6, further comprising:
using a clamping force as the manipulate variable.

15. The method according to claim 6, further comprising:
measuring a manipulated variable/slip characteristic in a phase, in which a coupling torque to be transmitted is constant over time.

16. A control device for a slip-controlled clutch having a clutch slip adjustable to a setpoint value using a manipulated variable, comprising:
a selector unit configured to select the setpoint value as a function of a number of operating parameters; and
a diagnostic unit configured to restrict the selection of the setpoint value to a permissible setpoint value when a derivative of a friction coefficient/slip characteristic at the setpoint value exceeds a specifiable limiting value.

17. The control device according to claim 16, wherein the diagnostic unit is configured to select, as an upper limit of a range of permissible setpoint values, a slip value at which a derivative of a manipulated variable/slip characteristic falls below the specifiable limiting value.

18. The control device according to claim 16, wherein the manipulated variable includes a clutch pressure.

19. The control device according to claim 16, wherein the manipulated variable includes a clamping force.

20. The control device according to claim 16, further comprising:
a measuring device coupled to an input side of the diagnostic unit and configured to ascertain the clutch slip.

* * * * *